United States Patent [19]
Wrigge
[11] Patent Number: 4,739,482
[45] Date of Patent: Apr. 19, 1988

[54] MOTOR VEHICLE MAINTENANCE INTERVAL MONITOR

[76] Inventor: William Wrigge, 921 Falling Leaf, Friendswood, Tex. 77546

[21] Appl. No.: 852,233
[22] Filed: Apr. 15, 1986
[51] Int. Cl.[4] ............ G06F 15/20
[52] U.S. Cl. ............ 364/424; 364/569; 340/52 D; 340/52 F; 73/117.3
[58] Field of Search ............ 364/424, 550, 551, 569; 340/52 R, 52 F, 52 D; 73/117.3

[56] References Cited

U.S. PATENT DOCUMENTS

| | | | |
|---|---|---|---|
| 4,031,363 | 6/1977 | Freeman et al. | 340/52 F |
| 4,067,061 | 1/1978 | Juhasz | 340/52 F |
| 4,523,283 | 6/1985 | Muhlberger et al. | 364/550 |
| 4,524,612 | 6/1985 | Bourauel et al. | 340/52 F |
| 4,525,782 | 6/1985 | Wohlfarth et al. | 340/52 R |
| 4,533,900 | 8/1985 | Muhlberger et al. | 364/424 |
| 4,612,623 | 9/1986 | Bazarnik | 364/569 |
| 4,630,027 | 12/1986 | Muhlberger et al. | 364/569 |

*Primary Examiner*—Gary Chin
*Attorney, Agent, or Firm*—Pravel, Gambrell, Hewitt, Kimball & Krieger

[57] ABSTRACT

A vehicle maintenance interval monitor allows selection of mileage intervals between servicing for a number of individual maintenance items. The monitor is computerized and has connections only to the vehicle's battery and ignition circuits. The miles traveled are computed by determining the running time of the vehicle and multiplying this time by a speed factor. When a service interval has been completed the monitor provides a suitable warning indication.

18 Claims, 6 Drawing Sheets

MOTOR VEHICLE MAINTENANCE INTERVAL MONITOR

BACKGROUND OF THE INVENTION

1. Field of the Invention

The invention relates to maintenance interval monitors, especially those designed for use with motor vehicles.

2. Description of the Prior Art

The maintenance of a modern motor vehicle is very important because of the constantly increasing cost of a new vehicle and of any major repairs to the vehicle. Most major repairs on a motor vehicle can be eliminated or delayed by proper attention to a relatively small number of items. Properly maintaining these items extends the period between major repairs as well as extends the vehicle life. Therefore it is important that the vehicle owner be aware of the need to service these items.

Generally, the important items need maintenance at different, independent intervals. For this reason, it is difficult for the owner to keep track of which item needs maintenance at which interval.

Additionally, the maintenance intervals vary depending upon the vehicle's actual use. For example, oil must be changed frequently when the vehicle is used only for short trips, while more miles are acceptable between oil changes if the vehicle is used only for long distance, highway driving. This variability of usage further complicates the problem of vehicle maintenance, because generally manufacturer maintenance recommendations are for only a single mileage value, thereby creating many non-optimal maintenance situations. For these reasons, a number of types of maintenance interval monitors have been proposed.

For example, U.S. Pat. No. 4,031,363 involved an electronic monitor which indicated the need for vehicle maintenance after a fixed time interval or after a fixed distance interval. The distance traveled was determined from the speedometer cable or other mileage sensor. The monitor did not allow the intervals to be changed by the vehicle owner.

U.S. Pat. No. 4,159,531 related to an electronic service indication system. When queried, the system indicated the next mileage at which maintenance should be performed and the names of the tasks to be performed. The suggested mileages between tasks was not alterable by the user and there was no prompting to indicate when service was to be performed. The system also allowed storage of the actual mileages at which service was performed by the proper facility, but required special equipment to record the values.

In U.S. Pat. No. 4,307,291, a mechanical maintenance monitor with a series of rotatable wheels was driven by the vehicle's speedometer cable. An electrical circuit closed to indicate set interval completion. A number of different intervals corresponding to different tasks could be set by the manufacturer, but the maintenance intervals were not adjustable by the owner.

U.S. Pat. No. 4,404,641 disclosed an electronic equipment maintenance monitor which compared elapsed running time with owner selectable time values to enable warning indicators and equipment disabling devices.

None of these devices was totally satisfactory for motor vehicle maintenance monitoring. The monitor should be very easy to install in a vehicle. This eliminates the devices requiring elaborate electrical connections or connections to the vehicle speedometer cable. Some object to connecting other meters than the speedometer to the speedometer cable. The monitor should use miles for the service interval because mileage is the common standard used to determine maintenance requirements. This eliminates the devices which only measure elapsed time. The monitor should allow the owner to individually select or vary maintenance intervals, to allow for individual vehicle use differences. This eliminates any devices which have maintenance intervals settable only by the manufacturer.

SUMMARY OF THE INVENTION

Briefly, the present invention provides a new and improved programmable motor vehicle maintenance interval monitor. The monitor is computer-based and the only connections to the vehicle required are to the battery and the ignition circuit. When the the vehicle is running the monitor displays six maintenance items and the mileage remaining until each item needs service. When the vehicle is not running, a display on the monitor shows the date and time. When the remaining mileage for a maintenance item passes zero, a warning device, such as a beeper, sounds indicating the need to service that maintenance item. After the service has been performed, the owner enters the desired number of miles before that item is to be next serviced. Additionally, the owner can change the remaining mileage in any category at any time to allow for changes in vehicle use or provide for early maintenance.

The elapsed mileage the vehicle has traveled is calculated from the running time of the vehicle. The monitor determines the elapsed time the vehicle has been running since the last mileage calculation was performed and multiplies this time by a speed factor to estimate the distance traveled since the last mileage calculation. The mileage calculations are done on a frequent basis to minimize starting and ending errors. The speed factor can be changed by the owner to better match individual driving conditions.

DETAILED DESCRIPTION OF THE PREFERRED EMBODIMENT

Figure 1:
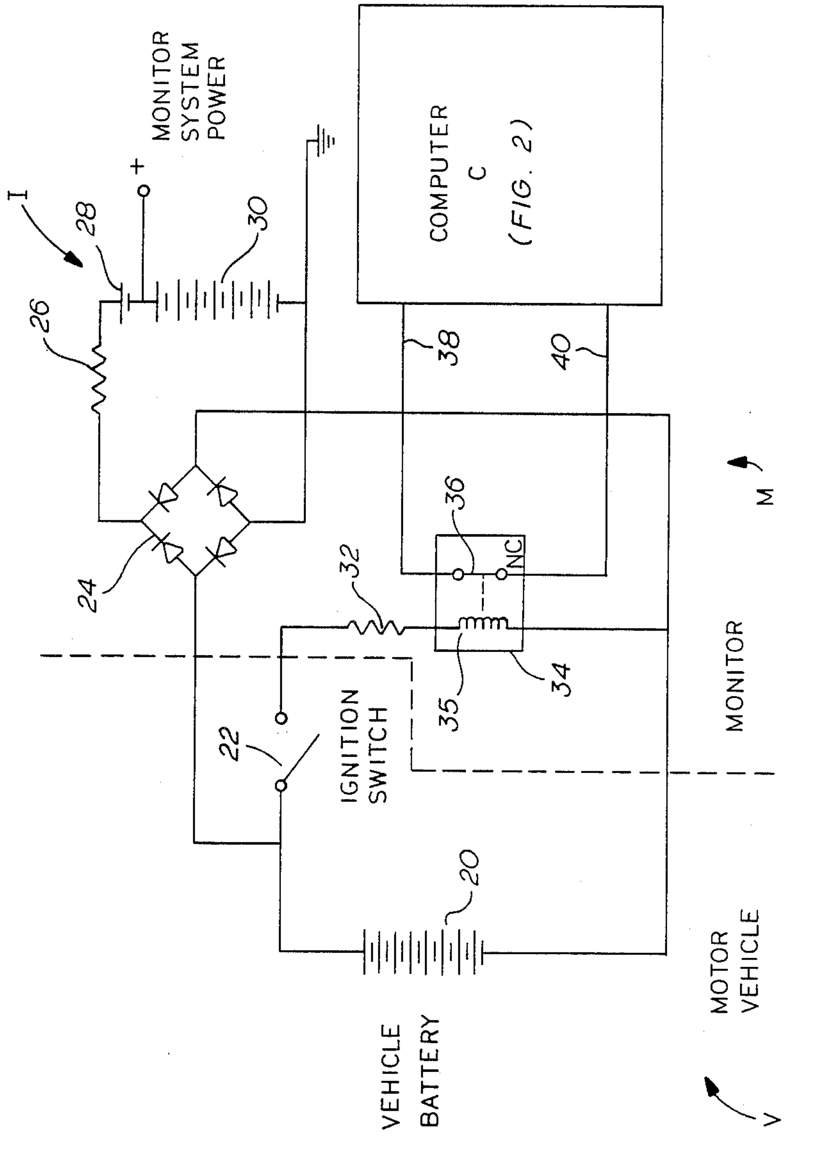
FIG. 1 is a schematic electrical circuit diagram showing an interface between the vehicle and the computer system of the present invention.
Figure 2:
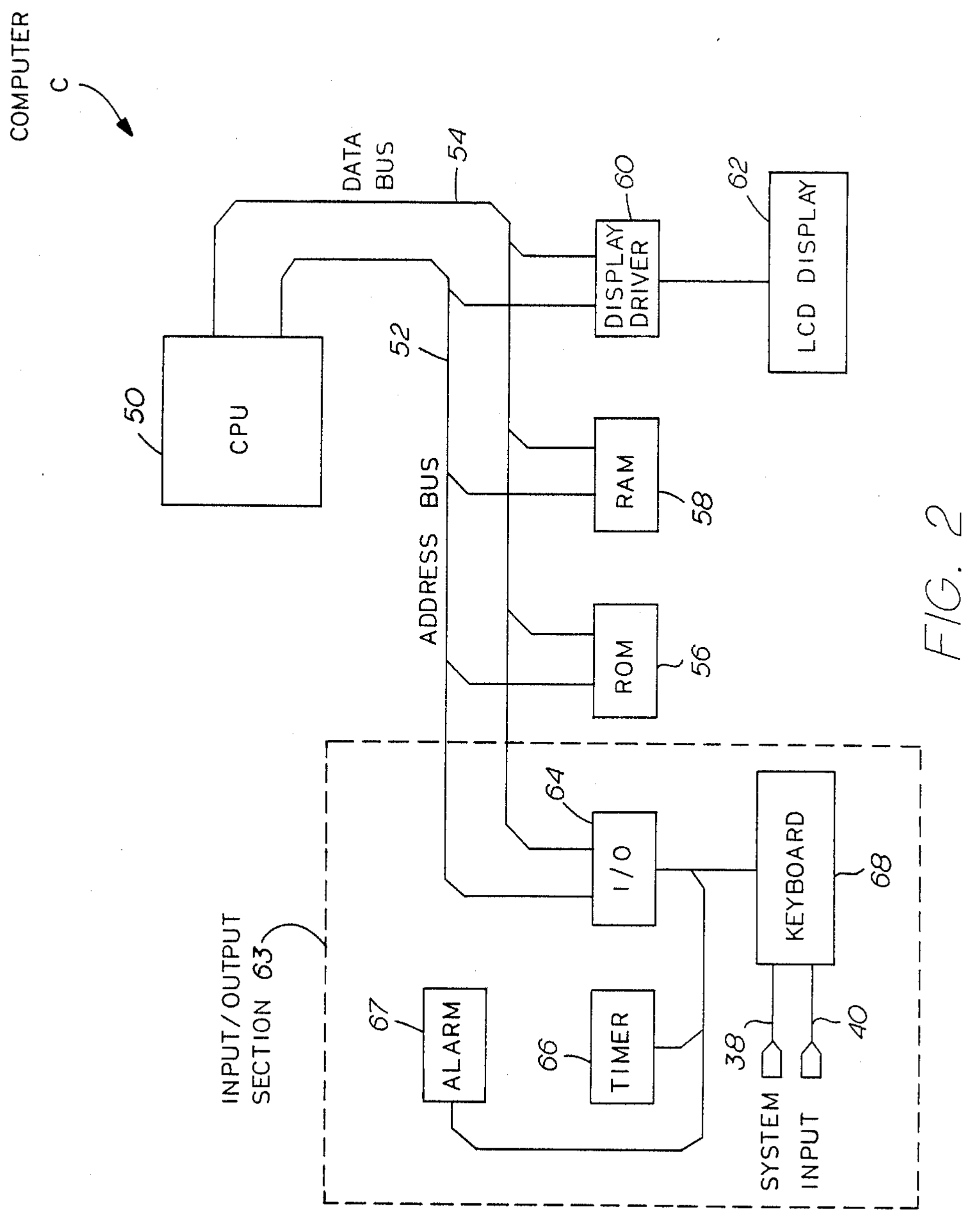
FIG. 2 is a schematic diagram of the computer system of the present invention.

In the drawings, a monitor module M (FIG. 1), which includes an interface unit I and a computer C is shown electrically connected to a battery 20 of a vehicle V. The monitor module M of the present invention allows an operator of the vehicle or maintenance personnel to determine when any of a selected number of maintenance items or tasks are to be performed. As will be set forth, the monitor module M of the present inventions permits a number, in the preferred embodiment six, of maintenance items with the same or different intervals to be separately monitored. Further, the individual intervals may be selectively varied as vehicle usage needs or experience vary. As is conventional, the vehicle battery 20 is electrically connected to an ignition switch 22. The remaining portions of the vehicle electrical system are conventional and for this reason not shown. A protective full wave rectifier diode bridge 24 is connected to the battery 20 to prevent any damage to the monitor M should either the vehicle battery 20 leads or monitor connections be reversed. The output leads of the bridge 24 are connected to a series connected current limiting resistor 26, a first battery 28 and a second battery series 30. The battery series 30 provides operating direct current power at the requisite voltage level to the computer C (FIG. 2) employed in the monitor M. The first battery 28 raises the overall voltage present at one input to resistor 26 to a greater level, preferably that of vehicle battery 20, to reduce the power dissipated in the current limit resistor 26, thereby extending vehicle battery life and reducing current drain.

The first battery 28 and the second battery series 30 perform the additional functions of voltage regulation and transient suppression to protect the computer C from undervoltage conditions during vehicle starting, overvoltage conditions due to vehicle electrical system failure and other transients present in the vehicle electrical system.

A bias resistor 32 and a relay 34 of the interface I are electrically connected to the vehicle ignition switch 22. The bias resistor 32 is used to provide the proper operating voltage or current to a coil 35 of relay 34. The relay 34 also has a single pole, normally-closed contact 36 which is connected over conductors 38 and 40 to the computer C. Because the contact 36 is normally-closed, when the vehicle ignition is off the contact 36 is closed, while when the ignition is on the contact 36 is open. In this manner the monitor M determines when the vehicle is running.

It is to be noted that there are only three connections between the monitor M and the vehicle's electrical system: a connection to ground, one to the positive terminal of the vehicle battery 20 and finally to the ignition switch 22. These are very simple connections generally available at the vehicle's fuse panel, allowing easy installation on many types of vehicles by persons of varying skill levels.

In the computer C (FIG. 2), a central processor unit 50 having an address bus 52 and a data bus 54 is connected to random access memory 58; read-only memory 56; a display 62, through a display driver 60; and an input/output section 63. The input/output section 63 has an input/output controller 64 connected to a timer 66, a beeper or other suitable alarm 67 and a keyboard matrix 68.

The timer 66 contains a free running timer which functions as a computer real time clock for the computer C. The processor 50 accesses the timer 66 to determine the day, hour, minute and second of the current time to allow the computer C to keep track of elapsed time.

Keyboard matrix 68 may be any of several commercially available computer data entry keyboards. The leads 38 and 40 from the relay contact 36 are connected to the keyboard matrix 68 across a suitable key, such as a parenthesis key. When the ignition is off, the parenthesis key appears electrically to be depressed because contact 36 is in its normally closed state. The keyboard 68 is used to enter the new mileage intervals for the various items stored in the monitor and query the monitor for the date and time and particular item mileage values.

The display 62 shows the vehicle operator or maintenance personnel, the date and time when the vehicle is not running. When the vehicle ignition switch 22 is closed the display 62 shows the mileage remaining before servicing of the various stored items. The display 62 allows confirmation of the keyboard buttons pressed while entering new information because the information for processor 50 obtained through input/output unit 64 is also presented on data bus 54 to display driver 60. The display 62 is preferably a liquid crystal display to preserve battery life and reduce system power requirements. The alarm 67 is accessible to the central processing unit 50 of computer C through input/output unit 64. In the preferred embodiment, the alarm 67 is a beeper which provides an audible warning when the established interval for a maintenance item has elapsed.

The computer C operates on a stored series of control instructions in the form of a computer program, the steps of which are shown schematically in FIGS. 3A, 3B, 3C and 4. When the monitor is first activated, an initialization sequence 100 (FIG. 3A) is performed to clear all data storage registers. The first step of the sequence is step 102, where an alarm flag is set to indicate that the alarm function is enabled. Step 104 then prepares the various item descriptors and initial values used in connection with the various maintenance items. The descriptors are the names of the maintenance items to be monitored, and are displayed in conjunction with the item's mileage value during monitor operation to ease owner understanding of the displayed information. For example, the maintenance items to be monitored in the preferred embodiment are oil change, tire rotation, spark plug change, transmission fluid change, belt replacement, and brake maintenance. The descriptors and maintenance interval values in miles are accordingly OIL, 2000; ROTATE, 7000; PLUGS, 10000; TRANS, 20000; BELTS, 25000; and BRAKES, 35000. A seventh item initialized is a speed factor, referred to as SPEED with a value of 45.0 mph. This value is used in conjunction with the elapsed time to determine the estimated miles the vehicle has traveled. After completing the initialization in step 104, control is transferred to the main program sequence 110.

The main program sequence 110 is the main control loop of the program. The sequence 110 commences at step 112 where the current time is determined by reading the timer 66. Step 114 follows and the old time is made equal to the current time. This is done so that errors do not occur because of a randomly generated initial old time. After step 114 is completed, step 116 determines the current time so that two times are available for calculation purposes.

Step 118 computes the elapsed time by subtracting the old time from the new time. This value is then used in step 120 where it is multiplied by the speed factor to determine an estimated distance traveled during the elapsed interval. The estimated mileage may be incorrect for any single interval, but by properly choosing the speed factor, the errors average out over a longer period of time and the total miles traveled as indicated by this indirect method is sufficiently close to the actual miles traveled.

Figure 4:
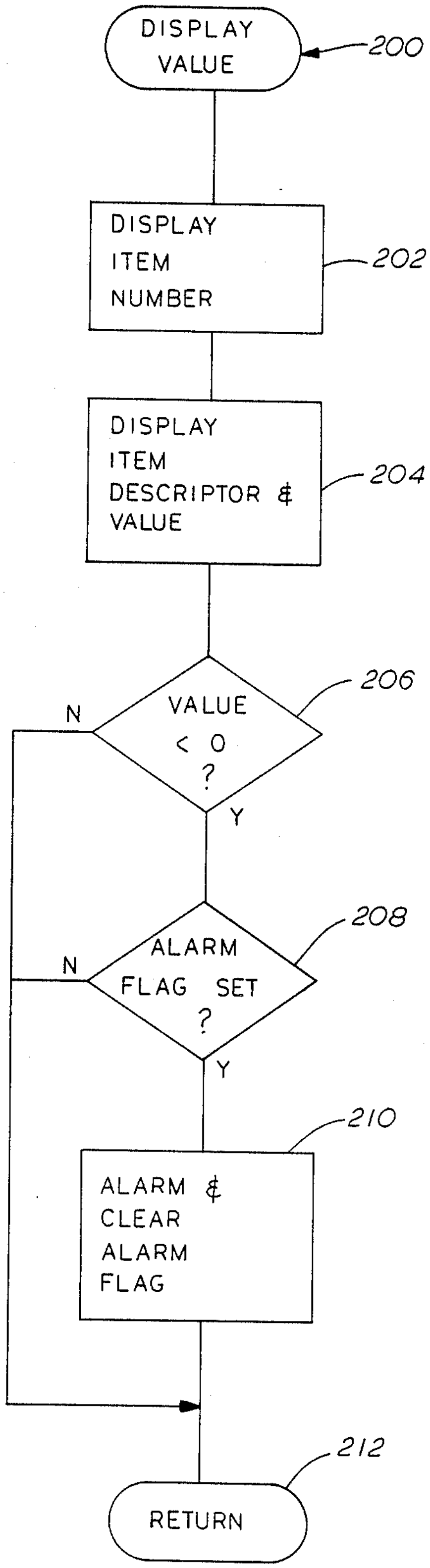
FIG. 4 is a flowchart illustration of the display subroutine sequence of the present invention.

Step 121 then sets a pointer to indicate the first of the six maintenance items. Step 122 then subtracts the estimated distance from the remaining mileage value of the item indicated by the pointer. This decrements the mileage value from either the initially preset value or the owner entered value so that when the value reaches zero or becomes negative, service is due on that item. After the updating of the item value is completed, the item is displayed in step 124 by using the display value subroutine 200 (FIG. 4).

When the display is completed, control returns to step 126, a decisional step. Step 126 determines if a valid character on the keyboard has been pressed. In the preferred embodiment, valid characters at this step are any non-control characters. If a valid character has not been pressed, control proceeds to step 127 where the pointer is incremented to point to the next maintenance item. Following this, step 128 (FIG. 3B) determines if the last item has been completed. Only the six maintenance items are displayed in this cyclic manner. The seventh item, the speed factor, is not displayed at this time because it is a constant and is not an item requiring servicing.

If step 128 determines that the last item has not been updated and displayed, control transfers to step 122 and the next item is processed. If the final item has been displayed, control transfers to step 130 where the current time is renamed to be the old time and control transfers to step 116 (FIG. 3A) to begin a new calculation cycle. The average time for a calculation cycle in the preferred embodiment of six maintenance items is approximately 9 seconds, each item display taking approximately 1½ seconds.

Figure 3A:
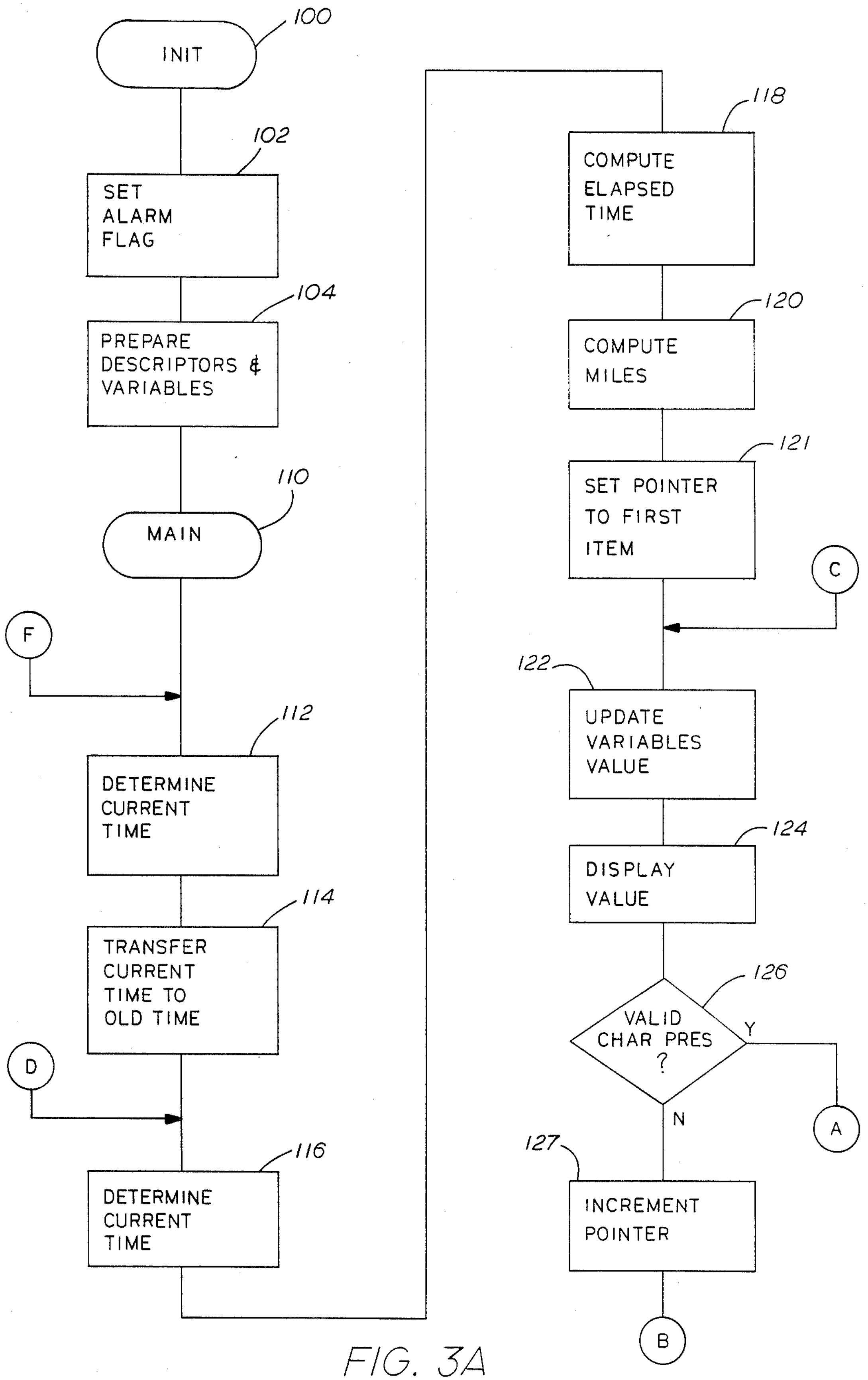
FIGS. 3A, 3B and 3C are flowchart illustrations of the initialization and main program sequences of the present invention.
Figure 3B:
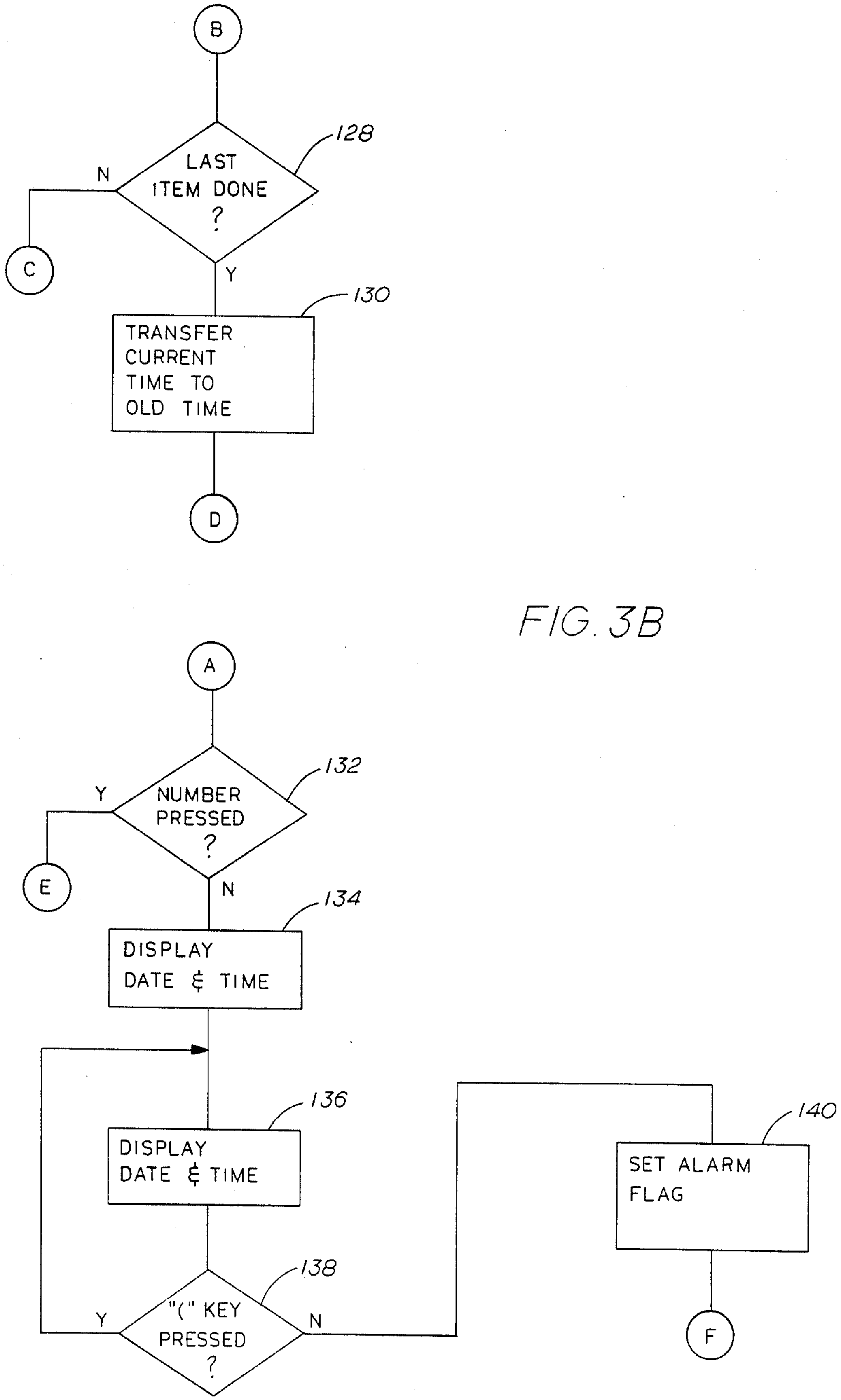
Figure 3C:
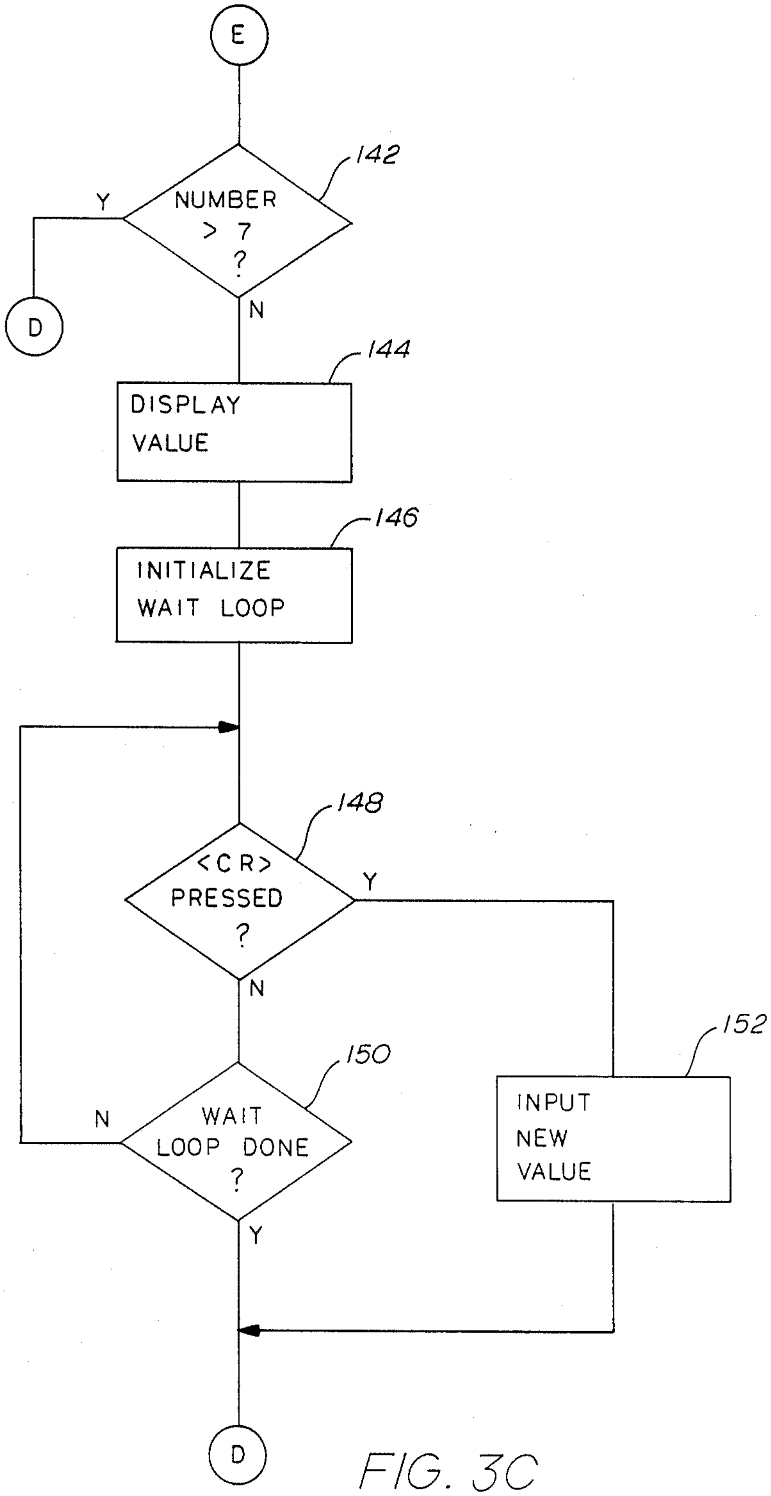

If step 126 determines that a valid character has been depressed, control transfers to step 132 (FIG. 3B). Step 132 determines if a number was pressed. If a number key was not depressed, step 134 displays the date and time. In this way the normal cyclic item display can be temporarily halted and the monitor used as a clock. After displaying the date and time in step 134, control proceeds to step 136 where the date and time are again displayed. Step 138 determines whether the key that was depressed was the parenthesis key connected to relay contact 36. If so, control proceeds to step 136 for a redisplay of the date and time. Because the relay contact 36 is connected to the parenthesis key, anytime the vehicle ignition is off, the monitor M stays in this loop and the date and time are continuously displayed.

If step 138 determines that the parenthesis key connected to relay contact 36 was not depressed, control transfers to step 140. Step 140 sets the alarm flag to enable the warning and indication function. This causes the alarm 67 to be activated every time the vehicle is started, because this portion of the program is performed every time the vehicle is started. This also sets the alarm flag if the date display is requested while the vehicle ignition is on, allowing the owner to enable the warning function after vehicle starting. After setting the alarm flag, control is passed to step 112 to restart the main sequence 110.

If a character other than the parenthesis key connected to relay contact 36 was depressed and the last item was not being displayed, the remaining items will not be updated. This causes a very minor error in the amount of accumulated miles for these items. It does not however affect the overall monitor accuracy because generally each main loop routine is performed in nine seconds, a time in which the vehicle travels only a fraction of a mile. The clock function is typically not accessed on a sufficiently frequent basis while the vehicle is running to affect long term monitor accuracy.

If step 132 determined that a number key had been depressed, control transfers to step 142 (FIG. 3C) which determines if the number was greater than seven. If so, control returns to step 116. In this case several items may be updated twice, but again, one erroneous loop does not practically affect the cumulative accuracy of the monitor.

If step 142 determined that the number was seven or less control is transferred to the display value subroutine 200 by step 144 and the item corresponding to the depressed number is displayed. This path is used to examine and optionally change the remaining mileage value of a particular maintenance item or the speed factor value. After returning from the display value subroutine 200, control proceeds to step 146 where a wait loop is initialized. Next, step 148 determines if a carriage return has been entered on the keyboard. If not, control passes to step 150 which determines whether the wait loop has finished. If not, control proceeds to step 148, forming a loop. This loop allows the owner a period of time to determine if this is the proper item to be changed and so indicate by pressing the carriage return key. If the wait loop is finished, control proceeds to step 116, allowing the program to continue if the wrong item had been selected.

If step 148 determined that a carriage return had been entered, step 152 allows the new value for the selected maintenance item to be entered from the keyboard 68 and displayed on the display 62. After the new value is entered, control returns to step 116 of the main loop (FIG. 3A).

In this manner the owner can change any of the values as desired and when desired. This allows new intervals to be reset after the maintenance has been performed and allows the owner to set the service intervals at individually desired mileages, not mileages suggested by the manufacturer. This enables the vehicle operator or maintenance personnel to better match the service intervals with their preferences and driving style and habits. This adaptable feature also allows a change in the mileage factor to better suit the operator's driving routine. If the trips are generally short trips done on heavily congested traffic, the speed factor should be lower to correspond to the slower average speeds and the service intervals should be shorter to correspond to the higher stress on the vehicle components. Conversely, if the vehicle is generally used for long trips on the open highway, a higher speed factor and longer mileage intervals can be used to reflect the higher average speed and lower vehicle stress. The present monitor allows these individual variations to be handled quite easily.

If a long, high speed trip is taken by a vehicle having a monitor M with a speed factor adjusted for slower average speeds the actual mileage of the vehicle will not correspond to the estimated mileage determined by the monitor M, but this is an acceptable result. The maintenance intervals for the higher speed condition are generally longer because of the lower stress imparted and so the apparent miscalculation is actually a better approximation of the need for maintenance than if the mileage estimation was actually accurate and the maintenance interval not changed. The same logic applies to the higher speed factor vehicle taken on a short trip. The monitor determined mileage is greater than the actual mileage, but more accurately reflects the vehicle stress levels during the intervals. These conditions assume that the speed factor is approximately correct based on the normal usage of the vehicle. If the different trips are not irregular, but become more frequent, the speed factor and maintenance intervals should, of course, be changed to reflect the change in vehicle usage.

It is to be noted that in the preferred embodiment the values can be altered only when the vehicle ignition is on because when the vehicle is off, the monitor only displays the date and time because the parenthesis key connected to contact 36 is always electrically sensed as being depressed.

The display value subroutine 200 (FIG. 4) performs the tasks of displaying the values for a given item and sounding the alarm 67 as appropriate. The first step in the subroutine after entry is step 202 where the item's number is displayed for a period of time. This is done to allow correlation between the item's numerical and descriptor representations. After the item number has been displayed, step 204 displays the maintenance item descriptor and the remaining mileage value for that item. Next, step 206 determines if the value is less than zero, which indicates that the item should be serviced. If this is the case, control proceeds to step 208 which determines if the alarm flag is set. If so, step 210 activates the alarm for a period of time to alert the owner and then clears the alarm flag. This clearing is done because it is desired that the alarm be active only after the car is started or after the date and time have been requested and not every time the particular item is displayed. After clearing the flag, control proceeds to step 212, the return to the routine 100.

If the mileage was zero or positive in step 206 or the alarm flag was cleared in step 208, control passes to step 212 and control returns to the calling routine.

The embodiment described above displays each maintenance item during the cyclic display operation period. If the number of maintenance items exceeds a larger number than six, it may be preferable that not all the items be displayed. This is because viewing the entire series would require a large amount of time and might require that the owner wait a long period to see a particular item of concern, especially those nearing service time. To this end, in an alternate embodiment only the three items closest to the end of their maintenance intervals are displayed. This makes it easier to monitor items nearing service.

The mileage value for all items is first calculated, with the lowest three being noted during the update calculations. After completing the update, the three noted items are displayed. After displaying the items the computer C then determines if a valid key has been pressed. A review of all the items is obtained by pressing a designated key on the keyboard 68, causing the computer C to perform a different subroutine to display all maintenance items.

As can be seen from the above description, the present monitor is very easy to install and yet is a very flexible system, working quite well under normal conditions.

The foregoing disclosure and description of the invention are illustrative and explanatory thereof, and various changes in the size, shape and materials, as well as in the details of the illustrated construction and logic flow may be made without departing from the spirit of the invention.

What is claimed is:

1. A vehicle maintenance interval monitor, comprising:

means for setting each of a plurality of maintenance intervals for the vehicle;

means for setting an estimated vehicle speed value;

means for determining vehicle running time;

means for calculating an estimated distance traveled by multiplying the vehicle running time by the estimated vehicle speed value;

means for comparing the estimated distance traveled with each of the maintenance intervals; and means for indicating when the estimated distance traveled has exceeded one of the maintenance intervals.

2. The monitor of claim 1, further comprising:

means for changing one of the maintenance intervals.

3. The monitor of claim 1, further comprising:

means for changing the estimated vehicle speed value.

4. The monitor of claim 3, further comprising:

means for changing one of the maintenance intervals.

5. The monitor of claim 1, further including:

means for electrically connecting said monitor to the vehicle.

6. The monitor of claim 5, wherein:

said means for electrically connecting is connected to the battery, the ignition switch and electrical ground of the vehicle.

7. The monitor of claim 1, wherein said vehicle running time is determined in a plurality of intervals, said distance traveled is calculated for each time interval resulting in distance intervals and said comparison is performed on the cumulation of said distance intervals.

8. The monitor of claim 1, further comprising:

means for displaying each of the maintenance intervals.

9. The monitor of claim 1, further comprising:

means for displaying the date and time.

10. The monitor of claim 9, wherein:

said means for displaying comprises means for displaying the date and time continuously when the vehicle ignition is off.

11. The monitor of claim 1, further comprising:

means for displaying vehicle speed value.

12. The monitor of claim 1, wherein said indication means comprises an audible alarm.

13. The monitor of claim 1, wherein said indication means comprises a means for forming a visual signal.

14. A method of monitoring motor vehicle maintenance intervals, comprising the steps of:

establishing a plurality of maintenance intervals;

setting an estimated vehicle speed value;

determining vehicle running time;

calculating an estimated distance traveled by multiplying the vehicle running time by the estimated speed value;

comparing the calculated estimated distance with each of the established maintenance intervals; and indicating when the calculated estimated distance traveled has exceeded one of the established maintenance intervals.

15. The method of claim 14, further comprising the step of:

changing one of the established maintenance intervals.

16. The method of claim 14, further comprising the step of:

changing the estimated vehicle speed value.

17. The method of claim 16, further comprising the step of:

changing one of the established maintenance intervals.

18. The method of claim 14, wherein:

said steps of determining vehicle running time, calculating an estimated distance, and comparing are continuously performed when the vehicle ignition is engaged.

* * * * *